United States Patent Office 3,664,840
Patented May 23, 1972

3,664,840
DIAZOTYPE PHOTOPRINTING MATERIAL
Tadashi Saito, Kawasaki-shi, Masaru Shimada, Yokohama-shi, and Kiyoshi Sakai, Tokyo, Japan, assignors to Kabushiki Kaisha Ricoh, Tokyo, Japan
No Drawing. Filed Apr. 1, 1969, Ser. No. 812,428
Claims priority, application Japan, Apr. 17, 1968, 43/25,763
Int. Cl. G03c 1/58, 1/54
U.S. Cl. 96—91    15 Claims

ABSTRACT OF THE DISCLOSURE

A diazotype photoprinting material containing a coupler compound having the following general formula.

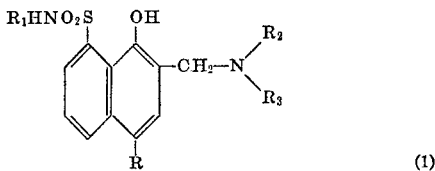
(1)

wherein R is a lower alkyl radical of from 1 to 4 carbon atoms, $R_1$ is hydrogen, lower alkyl-, aralkyl radical or

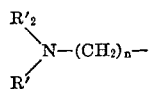

wherein $R'_2$ and $R'_3$ are each lower alkyl radicals, and $n$ is integer of from 1 to 3, and $R_2$ and $R_3$ are same or different lower alkyl- or alkylene radicals and may be linked together with carbon, oxygen, sulfur or nitrogen atom to form a heterocyclic ring.

BACKGROUND OF THE INVENTION (A) Field of the invention

The present invention relates to a diazotype photoprinting material containing a coupler compound having the following general formula:

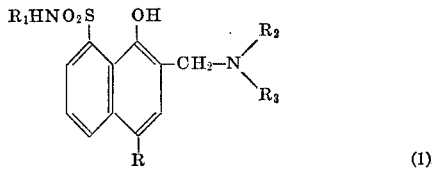
(1)

wherein R, $R_1$, $R_2$ and $R_3$ are as above defined.

These compounds give a dye-image of dark color tone by reaction with diazo-compounds, are stable and do not cause precoupling.

(B) Description of the prior art

It is known that compounds of the following general Formula 2 may be used as a coupler and give a dense blue dye-image by reaction with a diazo-compound:

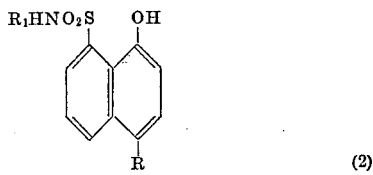
(2)

wherein R and $R_1$ areas above defined.

Such compounds, however, have the following disadvantages:

(1) The compounds, which have not reacted with a diazo compound in an ammonia atmosphere, have a yellow color and consequently contaminate the supporter of the photoprinting material and become yellowish in color.

(2) As the solubility of the compounds in acid or alkaline aqueous solution is very low, even though a large quantity of solubilizer is used, the photoprinting material giving a sufficiently high density of the dye-image cannot be obtained.

(3) The compounds of the aforesaid general formula have such a violent precoupling property that a photoprinting material capable of being preserved for a long time cannot be obtained.

It is, therefore, an object of the present invention to provide a diazotype photoprinting material capable of eliminating the aforesaid disadvantages.

SUMMARY OF THE INVENTION

The present invention relates to a diazotype photoprinting material which contains a coupler compound having the following general formula and producing a dye-image of dark color tone:

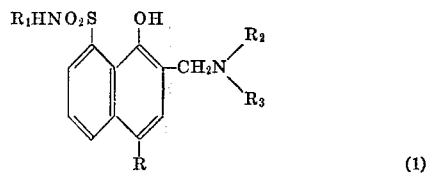
(1)

wherein R is a lower alkyl radical of from 1 to 4 carbon atoms, R is hydrogen, lower alkyl-, aralkyl radical or

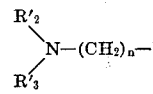

wherein $R'_2$ and $R'_3$ are each lower alkyl radicals, and $n$ is integer of from 1 to 3, and $R_2$ and $R_3$ are same or different lower alkyl- or alkylene radicals and may be linked together with carbon, oxygen, sulfur or nitrogen atom to form a heterocyclic ring.

We have found that the compounds, in which the Mannich base having the general formula

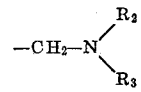

($R_2$ and $R_3$ are as above defined) has been introduced to the ortho-position to the OH-group of compounds of the general Formula 2, give a dense, dark blue dye-image by the reaction with a diazo-compound.

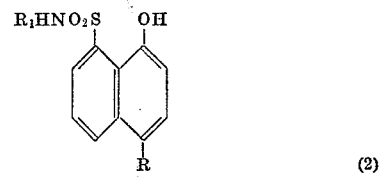
(2)

wherein R and $R_1$ are as above defined.

The compounds having the general Formula 1 may be advantageously used for a coupler of diazotype photoprinting materials as follows.

(1) The compounds of this invention do not produce a yellowish color change of the supporter of the photoprinting material and accordingly may provide a photoprinting material of good quality.

(2) The solubility of the compounds in water is very high owing to the introduction of Mannich base, and consequently there is no necessity for using solubilizers.

(3) On account of the introduction of Mannich base, the precoupling proceeds so slowly in acid condition that a photoprinting material capable of being preserved for a long time may be obtained.

The synthesis of the compound, which is used for a coupler of this invention, having the aforesaid general Formula 1 may be achieved as follows:

1 - hydroxy - 4 - methyl-naphthalene-8-methylamido-sulfonic acid, 25.1 g. (0.1 mol), is dissolved in 100 cc. of alcohol, and then 27.5 g. (0.15 mol) of dimorpholinomethane is added to the solution. This mixture is heated at 50–60° C. for 10–30 minutes. As the mixture is cooled, a white crystalline product separates. The product is filtered off and washed with alcohol. Thus, the compound (23.1 g.) having M.P. 182° C. is obtained. A series of such compound may be synthesized in a similar manner as above described. These analogous compounds are listed below.

(1)
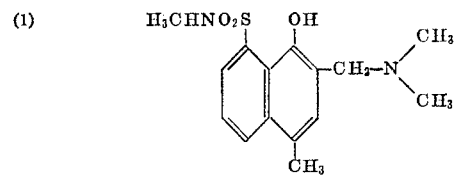

(1 - hydroxy - 2 - dimethylaminomethyl - 4 - methyl-naphthalene-8-sulfonic acid methylamide, M.P. 135° C.)

(2)
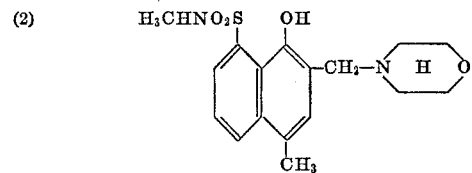

(1 - hydroxy - 2-morpholinomethyl-4-methylnaphthalene-8-sulfonic acid methylamide, M.P. 182° C.)

(3)
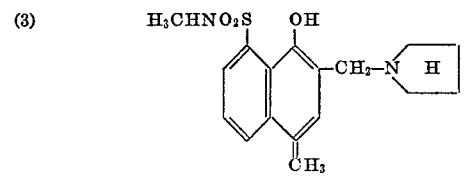

(1 - hydroxy - 2 - pyrrolidinomethyl - 4 - methyl-naphthalene-8-sulfonic acid methylamide, M.P. 153° C.)

(4)
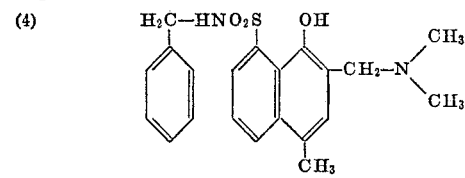

(1 - hydroxy - 2 - dimethylaminomethyl - 4 - methyl-naphthalene-8-sulfonic acid benzylamide, M.P. 85° C.)

(5)
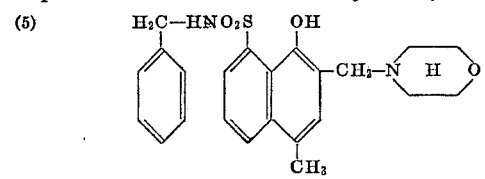

(1 - hydroxy - 2 - morpholinomethyl - 4 - methyl-naphthalene-8-sulfonic acid benzylamide, M.P. 96° C.)

(6)
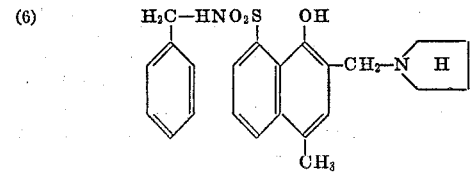

(1 - hydroxy-2-pyrrolidinomethyl-4-methylnaphthalene-8-sulfonic acid benzylamide, M.P. 102° C.).

(7)
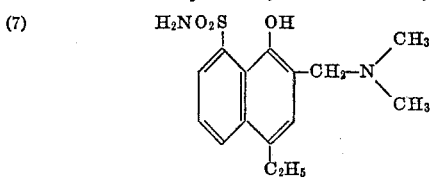

(1 - hydroxy-2-dimethylaminomethyl-4-ethylnaphthalene-8-sulfonic acid amide, M.P. 142° C.).

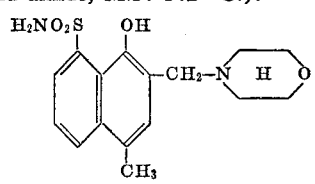

(1 - hydroxy-2-morpholinomethyl-4-methylnaphthalene-8-sulfonic acid amide, M.P. 197° C.).

(9)
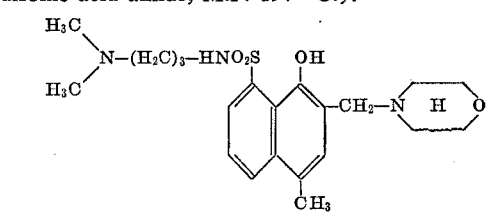

(1 - hydroxy-2-morpholinomethyl-4-methylnaphthalene-8 - sulfonic acid γ-N-dimethylamino-propylamide, M.P. 92° C.).

(10)
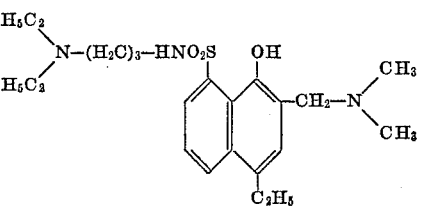

(1 - hydroxy-2-dimethylaminomethyl-4-ethylnaphthalene-8 - sulfonic acid γ-N-dimethylamino-propylamide, M.P. 90° (C.).

Diazo-compounds, which give a blue dye-image by the reaction with the aforecited couplers, are the compounds having the following general Formulas 3 and 4:

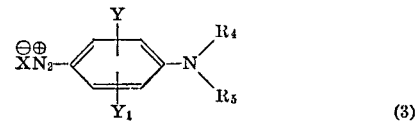

(3)

wherein $R_4$ is hydrogen or lower alkyl radical, $R_5$ is hydroxylated lower alkyl-, phenyl-, benzyl radical, lower alkoxy substituted benzoyl radical, and $R_4$ and $R_5$ are linked together with carbon, oxygen, sulfur or nitrogen atom to form a 5- or 6-member (atom) ring, X is an acid radical, and Y and $Y_1$ are hydrogen or a lower alkoxy radical, and when both Y and $Y_1$ are alkoxy radicals, they are located in the para-position.

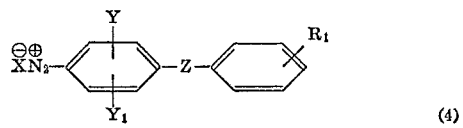

(4)

wherein $R_1$ is hydrogen, lower alkyl- or a lower alkoxy radical, X is an acid radical, and Y and $Y_1$ are hydrogen or a lower alkoxy radical, and when both Y and $Y_1$ are alkoxy radicals, they are located in the para-position, and Z is oxygen, sulfur or selenium.

The diazotype photoprinting materials of this invention are made of said diazo-compounds and the couplers of the general Formula 1 supra.

DESCRIPTION OF THE PREFERRED EMBODIMENTS

The present invention is further illustrated by the following non-limitative examples.

Example 1

| | G. |
|---|---|
| 4 - diazo - 2,5 - diethoxy-1-(4-methyl-thiophenyl)-benzene ½ZnCl₂ [a] | 1.0 |
| 1 - hydroxy - 2 - morpholinomethyl - 4 - methyl-naphthalene-8-sulfonic acid methylamide | 2.4 |
| Citric acid | 4.0 |
| HCl (39%) | 1.0 |
| Thiourea | 1.0 |
| Ethylene glycol | 1.0 |
| Water, 100 cc. | |

[a] Formula:

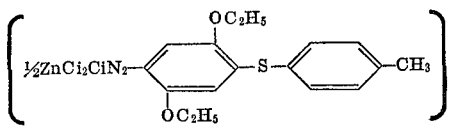

A solution which has been prepared by mixing the above components is coated onto a supporter such as paper or film and then it is dried up. The diazotype photoprinting material thus obtained gave a dense, dark blue dye-image by overlaying closely said photoprinting material upon a desired-image-carrying-original, exposing it to ultraviolet radiation and then developing it in ammonia vapor or in an alkaline aqueous solution.

Example 2

| | G. |
|---|---|
| 4 - diazo - 2,5 - diethoxy - 1 - (4'-methoxybenzoylamino)-benzene ½ZnCl₂ [a] | 1.0 |
| 1 - hydroxy - 2 - dimethylaminomethyl - 4 - ethylnaphthalene - 8 - sulfonic acid amide | 2.2 |
| Tartaric acid | 2.0 |
| Citric acid | 2.4 |
| HCl (39%) | 1.0 |
| Thiourea | 1.0 |
| Ethylene glycol | 1.0 |
| Water, 100 cc. | |

[a] Formula:

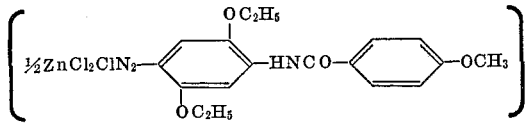

A diazotype photoprinting material was obtained from the components listed above by the same procedure as that of Example 1. The photoprinting material thus obtained gave a dense, dark blue dye-image by treating it in a manner similar to that in Example 1.

Example 3

| | G. |
|---|---|
| 1 - diazo - 2,5 - dibutoxy - 4 - morpholinobenzene ½ZnCl₂ [a] | 1.2 |
| 1 - hydroxy - 2 - pyrrolidinomethyl-4-methylnaphthalene-8-sulfonic acid benzylamine | 3.0 |
| Tartaric acid | 2.0 |
| Citric acid | 2.4 |
| H₂SO₄ (95%) | 0.2 |
| Thiourea | 1.0 |
| Ethylene glycol | 1.0 |
| Water, 100 cc. | |

[a] Formula:

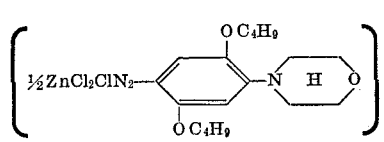

A diazotype photoprinting material was obtained from the components listed above by the same procedure as that of Example 1. The photoprinting material thus obtained gave a dense, dark blue dye-image by treating it in a manner similar to that in Example 1.

Example 4

| | G. |
|---|---|
| 1 - diazo - 2,5 - diethoxy - 4 - phenylaminobenzene ½ZnCl [a] | 1.0 |
| 1 - hydroxy - 2 - morpholinomethyl-4-methylnaphthalene - 8 - sulfonic acid N-dimethylamino-propylamide sulfonic acid | 3.7 |
| Citric acid | 4.0 |
| HCl (39%) | 1.0 |
| Ethylene glycol | 1.0 |
| Water, 100 cc. | |

[a] Formula:

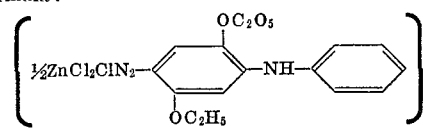

A diazotype photoprinting material was obtained from the components listed above by the same procedure as that of Example 1. The photoprinting material thus obtained gave a dense, dark blue dye-image by treating it in a manner similar to that in Example 1.

Example 5

| | G. |
|---|---|
| 1 - diazo - 2,5 - diethoxy - 4(4' - ethoxythiophenylbenzene ½ZnCl₂ [a] | 1.0 |
| 1 - hydroxy - 2 - dimethylaminomethyl-4-methylnaphthalene-8-sulfonic acid methylamide | 2.4 |
| Citric acid | 4.0 |
| HCl (39%) | 1.0 |
| Ethylene glycol | 1.0 |
| Water, 100 cc. | |

[a] Formula:

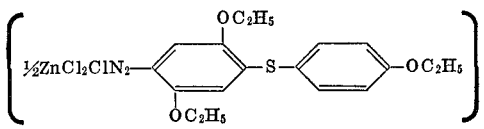

A diazotype photoprinting material was obtained from the components listed above by the same procedure as that of Example 1. The photoprinting material thus obtained gave a dense, dark blue dye-image by treating it in a manner similar to that in Example 1.

Example 6

| | G. |
|---|---|
| 1 - diazo - 2,5 - diethoxy-4-(N - methylbenzylamino)-benzene ½ZnCl₂ [a] | 1.0 |
| 1 - hydroxy - 2 - pyrrolidinomethyl-4-methylnaphthalene-8-sulfonic acid methylamide | 2.4 |
| Citric acid | 5.0 |
| HCl (39%) | 1.0 |
| Ethylene glycol | 1.0 |
| Water, 100 cc. | |

[a] Formula:

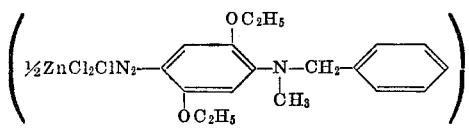

A diazotype photoprinting material was obtained from the components listed above by the same procedure as that of Example 1. The photoprinting material thus obtained gave a dense, dark blue dye-image by treating it in a manner similar to that in Example 1.

Example 7

| | G. |
|---|---|
| 1 - diazo - 4 - (N - ethyl - N - β - hydroxyethylamino) benzene ½ZnCl₂ ᵃ | 1.0 |
| 1-hydroxy - 2 - morpholinomethyl-4-methylnaphthalene-8-sulfonic acid amide | 3.0 |
| Tartaric acid | 1.0 |
| Naphthalenetrisulfonic acid | 5.0 |
| Thiourea | 8.0 |
| Sodium trichloroacetate | 3.0 |
| Saponin | 0.1 |

Water, 100 cc.

ᵃ Formula:

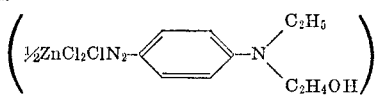

A diazotype photoprinting material was obtained from the components listed above by the same procedure as that of Example 1. The photoprinting material thus obtained gave a blue dye-image by overlaying closely said photoprinting material upon a desired-image-carrying-original, exposing it to light and then heating it to a temperature of 150–180° C. to develop.

We claim:

1. A diazotype photoprinting material comprising (1) at least one coupling compound having the following general formula

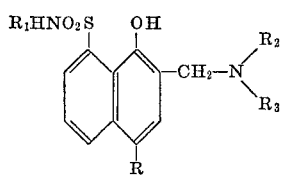

wherein R is lower alkyl of from 1 to 4 carbon atoms; $R_1$ is hydrogen, lower alkyl, aralkyl or

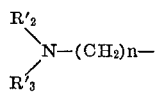

wherein $R'_2$ and $R'_3$ are same or different lower alkyl groups and $n$ is an integer of from 1 to 3 or $R'_2$ and $R'_3$ form a 5- or 6-membered saturated heterocyclic ring consisting of carbon, oxygen or sulfur together with the nitrogen atom to which they are attached;

(2) at least one light-sensitive diazonium compound selected from compounds having the formulae

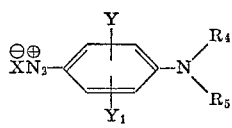

wherein $R_4$ is hydrogen or lower alkyl; $R_5$ is a hydroxylated lower alkyl, phenyl, benzyl, lower alkoxy-substituted benzoyl, or $R_4$ and $R_5$ together form a 5- or 6- membered saturated heterocyclic ring consisting of carbon, oxygen or sulfur with the nitrogen atom to which they are attached; X is an acid radical; Y and $Y_1$ are hydrogen or lower alkoxy, and when both Y and $Y_1$ are alkoxy, they are located in a para-position to each other and

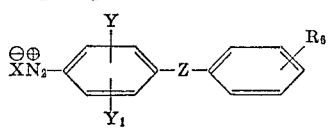

wherein $R_6$ is hydrogen, lower alkyl or lower alkoxy; X is an acid radical, Y and $Y_1$ are hydrogen or lower alkoxy, and when both Y and $Y_1$ are alkoxy, they are located in a para-position to each other and Z is sulfur, and (3) an acidic stabilizer.

2. A diazotype photoprinting material as defined in claim 1, wherein the coupling compound is 1-hydroxy-2-morpholinomethyl - 4 - methylnaphthalene-8-sulfonic acid methylamide of the formula

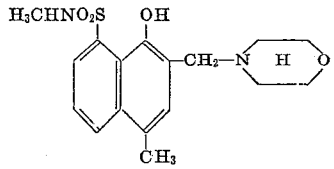

3. A diazotype photoprinting material as defined in claim 1, wherein the coupling compound is 1-hydroxy-2-dimethylaminomethyl-4-ethylnaphthalene-8-sulfonic acid amide of the formula

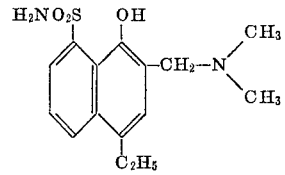

4. A diazotype photoprinting material as defined in claim 1, wherein the coupling compound is 1-hydroxy-2-pyrrolidinomethyl - 4 - methylnaphthalene-8-sulfonic acid benzylamide of the formula

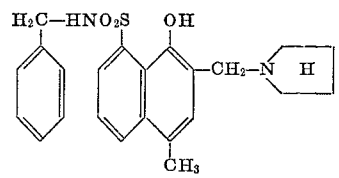

5. A diazotype photoprinting material as defined in claim 1, wherein the coupling compound is 1-hydroxy-2-morpholinomethyl - 4 - methylnaphthalene-8-sulfonic acid N-dimethylaminopropylamide of the formula

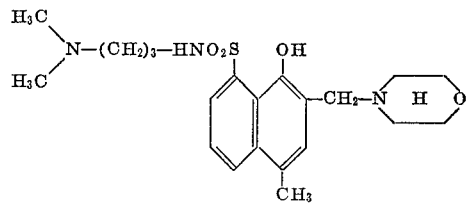

6. A diazotype photoprinting material as defined in claim 1, wherein the coupling compound is 1-hydroxy-2-dimethylaminomethyl - 4 - methylnaphthalene - 8-sulfonic acid methylamide of the formula

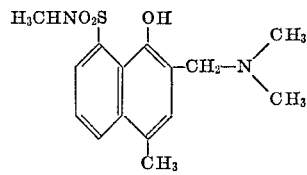

7. A diazotype photoprinting material as defined in claim 1, wherein the coupling compound is 1-hydroxy-2-pyrrolidinomethyl - 4 - methylnaphthalene-8-sulfonic acid methylamide of the formula

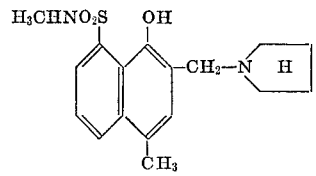

8. A diazotype photoprinting material as defined in claim 1, wherein the coupling compound is 1-hydroxy-2- morpholinomethyl - 4 - methylnaphthalene-8-sulfonic acid amide of the formula

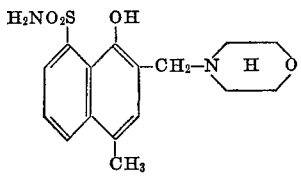

9. A diazotype photoprinting material as defined in claim 1, wherein the light-sensitive diazonium compound is 4-diazo-2,5-diethoxy-1-(4'-methyl-thiophenyl) benzene ½ZnCl₂ of the formula

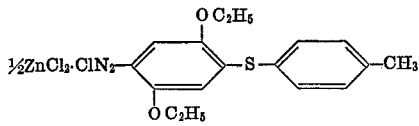

10. A diazotype photoprinting material as defined in claim 1, wherein the light-sensitive diazonium compound is 4 - diazo - 2,5 - diethoxy - 1-(4'-methoxybenzoylamino) benzene ½ZnCl₂ of the formula

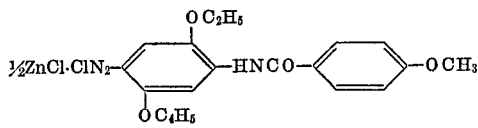

11. A diazotype photoprinting material as defined in claim 1, wherein the light-sensitive diazonium compound is 4-diazo-2,5-dibutoxy-1-morpholino-benzene ½ZnCl₂ of the formula

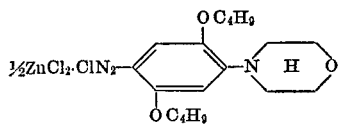

12. A diazotype photoprinting material as defined in claim 1, wherein the light-sensitive diazonium compound is 4-diazo-2,5-diethoxy-1-phenylaminobenzene ½ZnCl₂

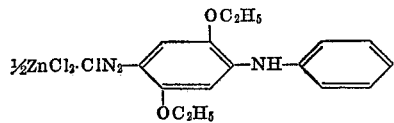

13. A diazotype photoprinting material as defined in claim 1, wherein the light-sensitive diazonium compound is 4-diazo-2,5-diethoxy-1-(4'-ethoxythiophenyl) benzene ½ZnCl₂ of the formula

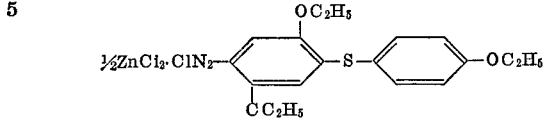

14. A diazotype photoprinting material as defined in claim 1, wherein the light-sensitive diazonium compound is 4-diazo-2,5-diethoxy-1-(N-methylbenzylamino) benzene ½ZnCl₂ of the formula

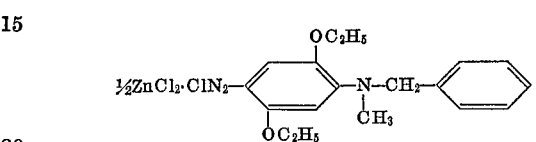

15. A diazotype photoprinting material as defined in claim 1, wherein the light-sensitive diazonium compound is 4-diazo-1-(N-ethyl-N-β-hydroxy-ethylamino) benzene ½ZnCl₂ of the formula

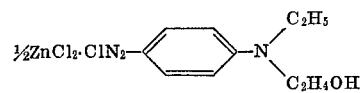

References Cited

UNITED STATES PATENTS

| | | | |
|---|---|---|---|
| 2,150,565 | 3/1939 | Schmidt et al. | 96—91 X |
| 3,343,960 | 9/1967 | Sus | 96—91 |
| 3,406,071 | 10/1968 | Sus et al. | 96—91 |
| 3,493,378 | 2/1970 | Sus | 96—91 |

FOREIGN PATENTS

| | | | |
|---|---|---|---|
| 491,095 | 8/1938 | Great Britain | 96—91 |

CHARLES L. BOWERS, JR., Primary Examiner

U.S. Cl. X.R.

96—49; 260—247.1, 326.81, 556